Jan. 13, 1970   D. CURRY III, ET AL   3,489,201
PORTABLE GATE
Filed Sept. 13, 1968
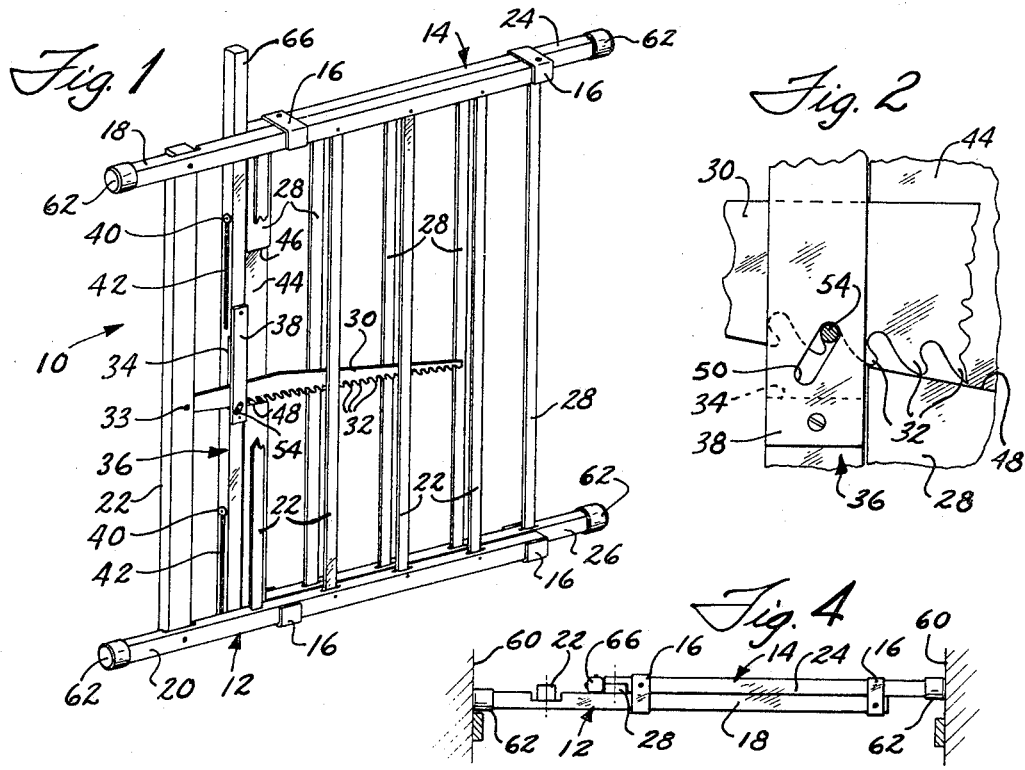
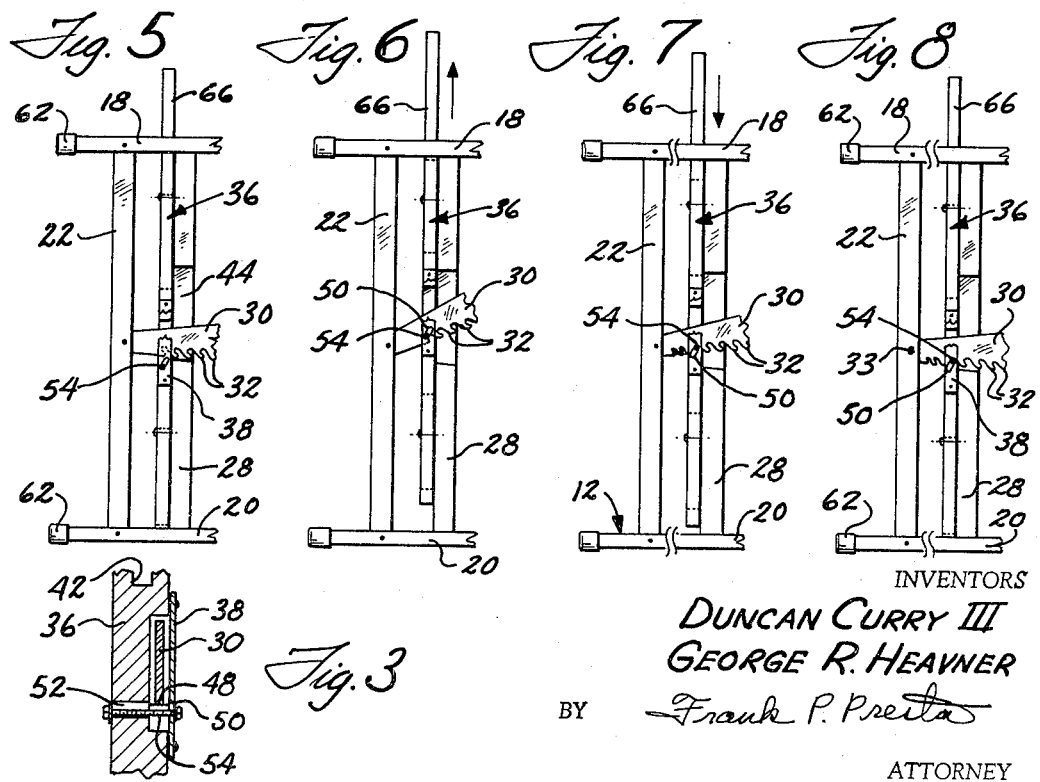
INVENTORS
DUNCAN CURRY III
GEORGE R. HEAVNER
BY Frank P. Presta
ATTORNEY

United States Patent Office 3,489,201
Patented Jan. 13, 1970

3,489,201
PORTABLE GATE
Duncan Curry III, 3395 Louis Road, Palo Alto, Calif. 94303, and George R. Heavner, 741 N. Van Dorn St., Alexandria, Va. 22310
Filed Sept. 13, 1968, Ser. No. 759,541
Int. Cl. E06b 3/92
U.S. Cl. 160—225          9 Claims

ABSTRACT OF THE DISCLOSURE

A portable, adjustable gate for a doorway or passageway, comprising a pair of gate sections that are slidably connected for inward or outward lateral movement. One of the gate sections has an elongated ratchet member pivotally mounted thereon, and the other gate section has a handle member slidably mounted for substantially vertical reciprocating movement thereon. The handle member has a pin or pawl member loosely mounted in a slotted portion thereof, the pin being adapted to engage the teeth of the ratchet member. Reciprocatory movement of the handle member causes the pin to engage successive teeth on the ratchet member, thereby serving to move the gate sections apart. When the gate sections engage the frame or wall surrounding a doorway or passageway, the pin can no longer advance along the teeth of the ratchet member, and the downward movement of the handle member will lock the pin between the teeth of the ratchet member in a manner to apply sufficient pressure to the surrounding frame or walls to lock the gate in the doorway or passageway.

BACKGROUND AND SUMMARY OF THE INVENTION

This invention relates to a portable gate and, more particularly, to a new and improved portable, adjustable gate which is semiautomatic in operation and which is adapted to serve as a barrier across doorways or passageways of different sizes.

Heretofore, various types of portable gates have been utilized to prevent passage of children or animals through doorways or passageways. While these gates generally have been satisfactory for the purpose intended, they all have been subject to certain disadvantages. The prior art gates have required the use of both hands of an adult to move and lock them in position and also to release them. In order to operate such a gate, therefore, the child or animal cannot be held by an adult, with the resultant disadvantage that the child or animal must be carefully watched by the adult while positioning, locking or releasing the gate.

Further, many prior art gates of the portable and adjustable type have been subject to the disadvantage of being weak in construction and thus easily movable by a child or animal pushing or leaning against them. Some of these gates have locking mechanisms which are easily moved to the release position with the result that they can be released inadvertently by the child or animal being confined. Other disadvantages of such a gate in present or past use are: (1) difficulty in adjusting the gates to fit different sized openings; (2) difficulty in securely mounting the gates within doorways or passageways defined by walls or frames that are inclined or not parallel; and (3) damage to walls or door frames caused by excessive locking pressure or sharp edges on such gates, or by required modifications to walls or door frames to make the gate operable.

Accordingly, it is an object of the present invention to provide a portable gate for a doorway or passageway which is easily adjustable and operable.

Another object is the provision of such a portable gate which is so constructed and arranged as to be substantially self-adjusting through semiautomatic operation by an easily manipulated handle member.

A further object is to provide such a portable gate which is so constructed and arranged as to apply the correct locking pressure on the gate sections in engagement with a doorway or passageway to firmly anchor the gate in a doorway or passageway and, at the same time, to prevent damage to the frame or walls engaged by the movable gate sections.

Still another object is the provision of such a portable gate which can be conveniently adjusted, locked or released with one hand of an adult, yet which is virtually impossible of inadvertent release by a child or animal being confined.

A still further object is to provide such a portable gate which is so constructed and arranged as to uniformly engage opposite sides of a door frame or walls that have uneven, or nonparallel oblique surfaces.

An additional object is the provision of such a portable gate which is sturdy, durable, simple in construction, efficient in operation, and easy to assemble, repair or handle.

Numerous other objects and advantages of the present invention will be apparent as it is better understood from the following description, which, taken in connection with the accompanying drawing, discloses a preferred embodiment thereof.

The above objects are accomplished by providing a portable, adjustable gate comprising a pair of gate sections that are slidably attached for opposite lateral movement. Each of the gate sections comprises a pair of vertically spaced horizontal bars that are joined by substantially vertically extending bars pivotally secured at each end to the horizontal bars. The pivotal mounting of the horizontal and vertical bars at each gate section enables the gate to be utilized in passageways or doorways wherein the frames or walls have nonparallel, uneven or inclined surfaces. An elongated ratchet member is pivotally mounted at one end on the outer vertical bar of one of the gate sections, and is provided with teeth on the lower surface thereof that are inclined downwardly in a direction away from the vertical bar on which the ratchet member is mounted. A handle member is slidably mounted for substantially vertical reciprocatory movement on the other gate section and is provided with a vertical slot through which the ratchet member extends, and a pair of laterally aligned slots in which a pin is slidably mounted for engagement with the teeth of the ratchet member. The slots are inclined downwardly in a direction toward the vertical bar of the one gate section on which the ratchet member is mounted. The handle member is provided with a gripping portion extending vertically above the top bars of the gate sections in a manner to be easily gripped by one hand of an individual desiring to adjust, lock or release the gate.

Each time the handle member is reciprocated through an upward and a downward movement, the pin on the handle member is advanced a number of teeth on the ratchet member and thus moves the gate sections apart a corresponding distance. Repeated reciprocation of the handle member, therefore, results in opposite lateral movement of the gate sections until the frame or walls of the doorway or passageway are engaged by the ends of the gate sections, at which point the pin can no longer advance along the teeth of the ratchet member. The gate sections may then be locked in this position by a downward movement of the handle member that moves the pin below center relative to the pivotal mounting of the ratchet member and locks the pin in a position in the upper surface of the handle member slots and between the teeth of the ratchet member that are inclined in a direction opposite to the slots. The gate can easily be released by an upward pulling on the handle member which serves to pivot the ratchet member upwardly to release locking pressure on the surrounding frame or walls. Thereafter, when the handle and ratchet members are moved downwardly, the pin is released from engagement with the ratchet member teeth and falls to the bottom of the handle member slots where it cannot be engaged by the ratchet member, thereby permitting inward movement of the gate sections.

Referring to the drawings:

FIGURE 1 is a perspective view of a portable gate constructed according to the principles of the present invention;

FIGURE 2 is an enlarged, partial front elevational view showing the locking mechanism for the gate when it is in a locked position;

FIGURE 3 is an enlarged partial side elevational view, with parts broken away and parts in section, showing the locking mechanism of the gate when it is in an unlocked position;

FIGURE 4 is a plan view of the gate in engagement with the walls of a doorway or passageway; and FIGURES 5 through 8 are partial front elevational views of the gate as its handle and locking mechanism are being moved from an unlocked to a locked position.

DESCRIPTION OF THE PREFERRED EMBODIMENT

As a preferred or exemplary embodiment of the present invention, FIGURE 1 illustrates a portable gate 10 generally comprising a pair of gate sections 12 and 14 that are slidably connected for opposite lateral movement by brackets 16 of any suitable or conventional construction. The first gate section 12 comprises a pair of vertically spaced horizontal bars 18 and 20 that are joined by a plurality of generally vertically extending bars 22 that are pivotally secured at each end to the horizontal bars. The second gate section 14 comprises a pair of vertically spaced horizontal bars 24 and 26 that are joined by generally vertically extending bars 28 pivotally secured at each end to the horizontal bars 24 and 26.

An elongated ratchet member 30 having teeth 32 on its lower surface is pivotally mounted at one end for rotation about a substantially horizontal axis 33 on the outer vertical bar 22 of the first gate section 12. The ratchet member teeth 32 are inclined downwardly in a direction away from the outer vertical bar 22. The ratchet member 30 is disposed between the gate sections 12 and 14 and extends through a vertical slot 34 in a handle member 36. The slot 34 is closed by an elongated plate member 38 that is attached to the handle member 36 in any suitable or conventional manner. The handle member 36 is slidably mounted for substantially vertical reciprocatory movement on the end vertical bar 28 of the second gate section 14. The mounting of the handle member 36 on the outer vertical bar 28 may be accomplished in any suitable or conventional manner, such as by pins 40 that are secured to the vertical bar 28 and extend through vertical channels 42 in the handle member.

The end vertical bar 28 is provided with a recessed portion 44 that is defined by upper and lower shoulders 46 and 48, respectively (see FIGURES 1 and 2). The ratchet member 30 is disposed in the recessed portion 44 of the end vertical bar 28 and its upward and downward pivotal movement is limited by the shoulders 46 and 48, respectively.

As shown in FIGURES 2 and 3, the plate member 38 and the opposing portion of the handle member 36 defining the slot 34 are provided with laterally aligned slots 50 and 52, respectively, in which a pin 54 is slidably mounted for engagement with the teeth 32 of the ratchet member 30. The slots 50 and 52 in the plate 38 and handle member 36 are inclined upwardly in a direction away from the outer vertical bar 22 of the first gate section 12 on which the ratchet member 30 is pivotally mounted. When the pin 54 is disposed in the lower ends of the slots 50 and 52, and the handle member 36 is in its lowermost position with the ratchet member 30 resting on the lower shoulder 48 (see FIGURES 1 and 5), the ratchet member teeth 32 are disposed above and cannot engage the pin 54, thereby permitting movement of the gate sections 12 and 14 inwardly or outwardly.

Generally, in the operation of the instant portable gate, each time the handle member 36 is reciprocated through an upward and a downward movement, the pin 54 on the handle member 36 is advanced a number of teeth 32 on the ratchet member 30 and thus moves the gate sections 12 and 14 apart a corresponding distance. This is accomplished by the appropriate inclination, size and spacing of the ratchet member teeth 32; the geometry and positioning of the ratchet member; and the position of the upper shoulder 46, such that the pin 54 will ride along the lower surfaces of one or more teeth 32 as the ratchet member 30 is being pivoted upwardly by the handle member 36 and will advance a number of teeth as the ratchet member reaches its uppermost position. More specifically, the ratchet member 30 must be of such a width and configuration as to enable the ratchet member to be pivoted upwardly a sufficient distance before engaging the upper shoulder 46 to allow the pin 54 to advance one or more teeth 32 on the ratchet member. As shown in FIGURE 1, this may be accomplished by suitably tapering the upper surface of the ratchet member 30 downwardly in a direction away from the outer vertical bar 22 of the first gate section 12. Thereafter, as the ratchet member 30 is pivoted downwardly by the handle member 36, the pin 54 will move upwardly in the handle member slots 50, 52 into the space between a pair of ratchet teeth so as to be locked therebetween during the balance of the downward movement of the ratchet member.

Repeated reciprocation of the handle member 36, therefore, results in opposite lateral movement of the gate sections 12 and 14 until the frame or walls 60 of a doorway or passageway to be closed are engaged by the ends of the gate sections (see FIGURE 4). The horizontal bars 18, 20 and 24, 26 of the gate sections 12 and 14, respectively, are provided with flexible and resilient end portions or covers 62 which may be formed of any suitable material such as rubber for the purpose of providing a nonslip engagement with and preventing damage to the walls 60 defining the passageway to be closed. The pivotal connections between the horizontal and vertical bars of each of the gate sections 12 and 14 enable the gate sections to be tilted so that the end portions or covers 62 can adequately engage frames or walls 60 having uneven, oblique or nonparallel surfaces.

Referring more specifically to the operation of the portable gate 10 as shown in FIGURES 1, 2 and 5-8, when it is desired to utilize the gate 10 to close a doorway or passageway, it may be conveniently picked up by gripping with one hand the upper portion 66 of the handle member 36 which extends above the top bars 18 and 24 of the gate sections 12 and 14. While holding a child or animal to be confined with the other hand, the gate may be positioned with the one hand in the doorway or passageway to be closed, with the end portions or covers 62 of the horizontal bars in spaced relation to the walls 60 defining the passageway. In this position, with the handle member 36 in its lowermost position, the ratchet member 30 is resting on the lower shoulder 48 of the end vertical bar 28 of gate section 14, and the pin 54 is disposed in the bottom portion of the slots 50 and 52 in the plate 38 and handle member 36, respectively (see FIGURE 5). As hereinbefore described, the ratchet member teeth 32 cannot engage the pin 54 in this position and the gate sections 12, 14 are thus freely movable inwardly or outwardly.

When it is desired to lock the gate 10 in the passageway, the handle member 36 is moved upwardly to engage the pin 54 in the space between a pair of teeth 32 on the ratchet member 30, as shown in FIGURE 6. As described hereinabove, as the handle member 36 and the ratchet member 30 are moved to their uppermost positions, the pin 54 will ride along the lower surface of one or more ratchet member teeth 32 and will advance a number of teeth to a space between another pair of teeth (to the right, as shown in FIGURES 2 and 6). As the handle member 36 is thereafter moved downwardly, as shown in FIGURE 7, the pin 54 will ride up in the slots 50 and 52 of the plate 38 and handle member 36, respectively, and between the lastmentioned pair of ratchet teeth to force the gate sections 12 and 14 a corresponding distance apart as the handle member 36 is moved to its lowermost position shown in FIGURE 8 wherein the pin is locked between the pair of ratchet teeth 32 and the upper ends of the slots 50 and 52.

Repeated vertical reciprocation of the handle member 36 will cause opposite lateral movement of the gate sections 12 and 14 until the walls 60 of the passageway are engaged by the end portions or covers 62 of the gate sections 12 and 14. When these end portions or covers 62 are in engagement with the walls 60, the pin 54 can no longer advance along the teeth 32 of the ratchet member 30. The gate sections 12 and 14 may then be locked in this position by a final downward movement of the handle member 36 which serves to move the pin 54 below center relative to the pivotal axis 33 of the ratchet member and to lock the pin 54 in a position in the upper ends of the slots 50, 52 and between the teeth 32 of the ratchet member 30 that are inclined in a direction opposite to the slots 50, 52 (see FIGURES 2 and 8). Because of the positioning of the shoulder 48 on the end vertical bar 28 of the gate section 14, the ratchet member 30 can be pivoted downwardly a sufficient distance to enable the pin 54 to be positioned below center relative to the pivotal axis 33 of the ratchet member.

The above procedure for positioning and locking the gate 10 within a doorway or passageway can easily be accomplished with the use of only one hand. When it is desired to release the gate, all that is required is to grip the upper portion 66 of the handle member, which serves to pivot the ratchet member 30 upwardly to release locking pressure on the walls 60. Thereafter, when the handle member 36 and ratchet member 30 are moved downwardly to their lowermost positions, the pin 54 is released from engagement with the ratchet member teeth 32 and falls to the bottom of the handle member slots 50, 52 where it cannot be engaged by the teeth 32, thereby permitting inward movement of the gate sections 12, 14. The gate may then be removed from the passageway and conveniently stored or moved to another location with one hand by merely gripping the upper portion 66 of the handle member 36.

An alternate procedure for positioning and locking the gate 10 within a doorway or passageway is to use two hands to slidably move the gate sections apart until their end covers 62 engage the surrounding walls 60. Thereafter, the upper portion 66 of handle member 36 is gripped with one hand and the handle member 36 is vertically reciprocated a few times to further separate the gate sections and apply the proper locking force via the end covers 62 to the surrounding walls 60.

It is noted that it is virtually impossible for a child to intentionally or inadvertently release the locked gate 10 of the instant invention for the reason that the gripping portion 66 of the handle member 36 extends upwardly above the gate sections 12 and 14 and either cannot be reached by a child or, if reached, cannot be released, since the pin 54 is tightly wedged between the ratchet teeth 32 and the upper ends of the slots 50, 52 when in the locked position and it takes a substantial upward force to release it.

The components of the instant gate 10 may be formed of any suitable materials without departing from the scope of this invention. As an illustrative example, the gate sections 12, 14 and the handle member 36 may be formed of wood, and the pin 54, plate 38 and ratchet member 30 may be formed of metal.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

We claim:
1. A portable gate, comprising:
    first and second gate sections slidably secured together for apposite lateral movement,
    an elongated ratchet member pivotally mounted on said first gate section for rotation about a substantially horizontal axis, said ratchet member having a plurality of teeth on the lower surface thereof that are inclined downwardly in a direction away from the portion of said first gate section on which said ratchet member is pivotally mounted, and
    a handle member slidably mounted for substantially vertical reciprocatory movement on said second gate section and having a pin disposed subjacent to said ratchet member teeth, said pin being engageable with said teeth when said handle member is moved upwardly to pivot said ratchet member upwardly,
    said ratchet member being of such a width and configuration as to enable said ratchet member to be pivoted upwardly at an angle sufficient to clear said pin and to allow said pin to advance along said ratchet member teeth when said handle member is moved upwardly, and to be locked between a pair of said teeth during downward movement of said ratchet member whereby upon repeated reciprocation of said handle member and resulting pivotal movement of said ratchet member said pin advances along said ratchet member teeth to move said gate sections apart in opposite lateral directions.

2. The portable gate of claim 1 wherein said handle member has a slot therein, and said pin is slidably mounted in said slot for movement toward and away from said ratchet member teeth.

3. The portable gate of claim 2 wherein said handle member slot is inclined downwardly in a direction opposite to the downward inclination of said ratchet member teeth.

4. The portable gate of claim 1 wherein the upper surface of said ratchet member is inclinded downwardly in a direction away from the portion of said first gate section on which said ratchet member is pivotally mounted.

5. The portable gate of claim 1 wherein each of said gate sections comprises upper and lower substantially horizontally extending bars, and a plurality of substantially vertically extending bars pivotally secured to said horizontally extending bars.

6. The portable gate of claim 1 wherein said handle member has a gripping portion extending upwardly above the upper surfaces of said gate sections.

7. The portable gate of claim 3 wherein said ratchet member teeth, said handle member slot and said pin are so positioned that during upward movement of said handle member said pin engages one of said ratchet member teeth to pivot said ratchet member upwardly and advance a number of teeth, and during downward movenent of said handle member said pin is locked in the upper end of said handle member slot between a pair of said teeth.

8. The portable gate of claim 7 wherein said second gate section comprises means for limiting the downward pivotal movement of said ratchet member to a position wherein said pin is adapted to be disposed below center relative to the pivotal axis of said ratchet member when said pin is in locking engagement with said ratchet member teeth.

9. The portable gate of claim 8 wherein said limiting means and said handle member slot are so positioned that when said pin is in the lower end of said handle member slot and said handle member is in its lowermost position with said ratchet member in engagement with said limiting means, said ratchet member teeth are disposed above and cannot engage said pin, thereby permitting relative movement of said gate sections.

References Cited

UNITED STATES PATENTS

| | | | |
|---|---|---|---|
| 252,596 | 1/1882 | Caltrider | 160—223 X |
| 1,683,204 | 9/1928 | Mills | 160—225 X |
| 1,798,600 | 3/1931 | Gooch | 160—225 X |
| 1,962,569 | 6/1934 | Miller | 160—225 |
| 2,120,625 | 6/1938 | Peckenpaugh | 74—141.5 |
| 2,266,015 | 12/1941 | Fink | 74—126 |
| 2,520,664 | 8/1950 | Turner | 160—136 |
| 2,559,066 | 7/1951 | Diefenbronn | 160—224 |
| 3,221,409 | 12/1965 | Thiel et al. | 74—141.5 X |

PETER M. CAUN, Primary Examiner